March 17, 1970     A. V. WOODWARD     3,500,887
DETACHABLE CLEAT DEVICE FOR OFF-HIGHWAY USE OF SKID CHAINS
Filed Feb. 14, 1968
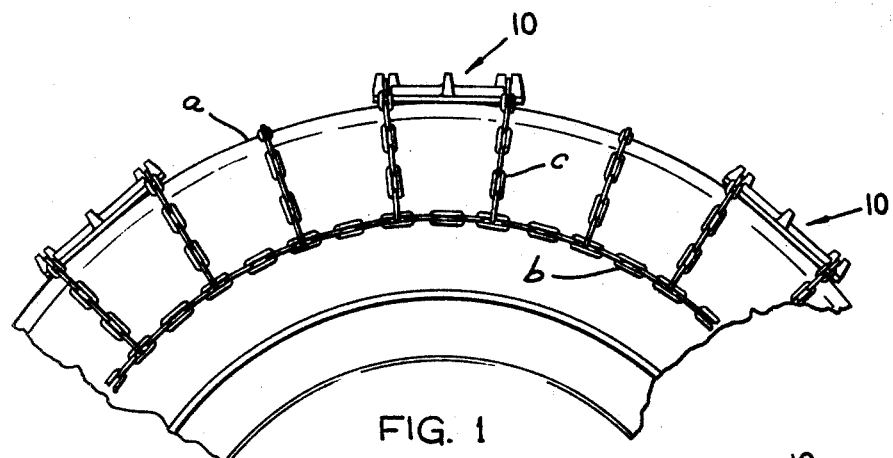
FIG. 1
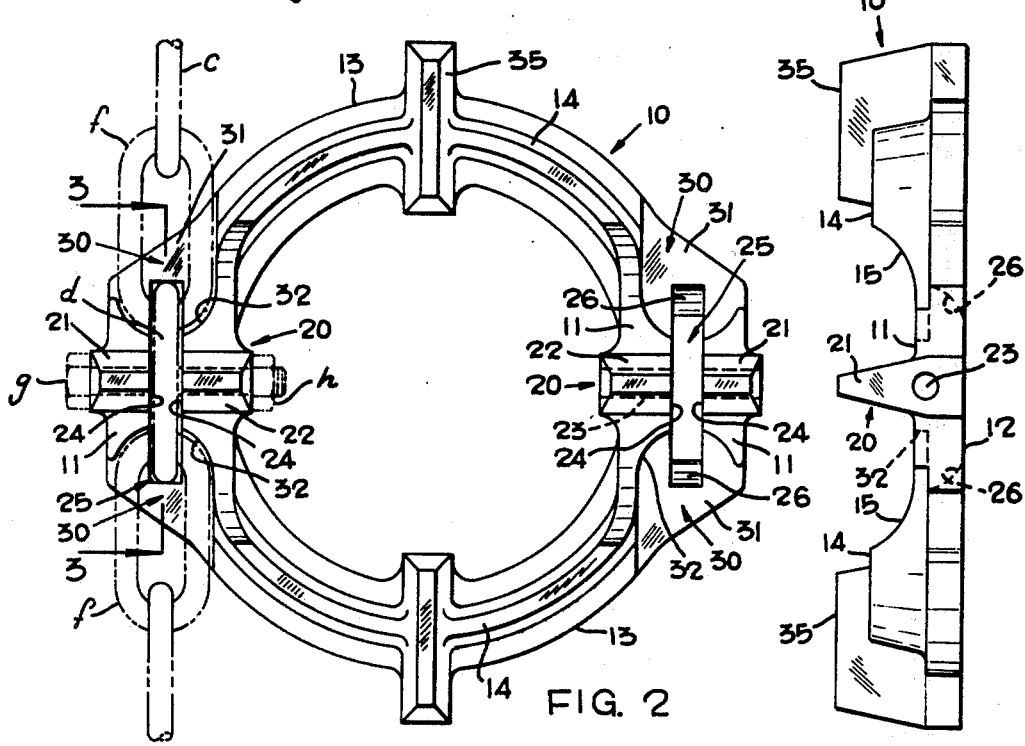
FIG. 2
FIG. 4
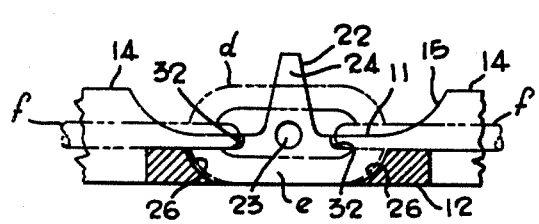
FIG. 3
Inventor
ARTHUR V. WOODWARD
By *Jesse A. Gross*
Attorney United States Patent Office 3,500,887
Patented Mar. 17, 1970

3,500,887
DETACHABLE CLEAT DEVICE FOR OFF-
HIGHWAY USE OF SKID CHAINS
Arthur V. Woodward, Springfield, Ill., assignor to TRAK-
power, Inc., Portland, Oreg., a corporation of Oregon
Filed Feb. 14, 1968, Ser. No. 705,451
Int. Cl. B60c 27/20
U.S. Cl. 152—230   8 Claims

ABSTRACT OF THE DISCLOSURE

A detachable cleat device, intended principally for large automotive equipment, adapts ordinary cross-linked tire chains to off-highway use, to overcome lateral sliding. A ring-like frame extends between two adjacent cross chains. At each it has base portions with longitudinal cleat projections, cross-slotted to receive a link of the cross chain perpendicular to the tread. The cleat projections, bored longitudinally, permit bolting through the received link. Those links adjacent to the bolted links are supported parallel to the tread, in recesses which avoid localized wear.

BACKGROUND OF THE INVENTION

When heavy vehicles such as those used in lumber camps and other off-highway use, are operated on paved roads, conventional cross-linked tire chains afford satisfactory traction for driving and braking. Such conventional chains are, however, unsuitable for off-highway use, particularly where the vehicle may be operated on sloping earth, where lateral sliding becomes a serious problem.

Heavy cleat devices have previously been incorporated permanently into skid chains for off-highway use only. These are undesirable because of their unsuitability for use on paved roads. Also, the short lengths of chain by which they are attached do not wear well, as compared to factory-welded chains.

The purposes of the present invention include providing a detachable cleat device for adapting factory-welded chains to off-highway use, with easy attachment and removal. A further purpose is to so precisely support the cross-chain links to which the device is secured as to avoid localized wear. A still further purpose is to incorporate sure means to minimize lateral sliding, against which conventional cross-linked chains afford no significant protection.

SUMMARY OF THE INVENTION

Summarizing generally, and without limitation, the present invention is a device attachable to cross chains of conventional skid chains without cutting them. It has first and second base portions, slotted at a spacing substantially equal to the spacing of the cross chains, connected by an open frame member whose laterally extending side portions stabilize the device and carry intermediate cleats. On the base portion at each cross chain, adjacent to the slot, are longitudinally extending cleats having a longitudinal bore and divided by the slot. A longitudinal bolt or like fastener through such bore penetrates through a cross chain link positioned perpendicularly in the slot. Adjacent recesses in the base portion support the links on both sides of that link penetrated by the bolt. The longitudinally extending cleat portions thus not only serve to minimize lateral sliding, but also house the bolts by which the device is readily attached to the cross chains.

BRIEF DESCRIPTION OF THE DRAWINGS

FIG. 1 is a fragmentary side view of a tire and skid chain on whose cross chains are mounted several detachable cleat devices embodying the present invention.

FIG. 2 is an enlarged plan view of one of said devices, with a securing bolt and a cross chain shown in phantom lines.

FIG. 3 is a fragmentary sectional view taken along line 3—3 of FIG. 2.

FIG. 4 is a right-end view of the device of FIG. 2.

DESCRIPTION OF THE PREFERRED EMBODIMENT

Conventional automotive skid chains, such as those mounted on the tire $a$ shown fragmentarily in FIG. 1, include side chains $b$ adjacent to both sidewalls of the tire $a$ and cross chains $c$ which extend at spaced intervals across the tread of the tire $a$ from one of the side chains $b$ to the other.

The present detachable cleat device is generally designated 10. Formed preferably as a steel casting, its general form is that of an open, circular frame having a pair of longitudinally aligned base portions 11 whose under surfaces 12 are to be positioned on the tread of the tire $a$, connected by arcuate side portions 13 which extend ring-like laterally outward from the base portions 11 and connect them and serve as means to establish their spacing. An upward projecting rib 14 on the arcuate side portions 13 terminates at the base portions 11 in downward curved portion 15, as shown in FIGS. 3 and 4.

Projecting from the base portions 11 are upward tapering longitudinally extending cleat-like means generally designated 20. Each is divided in two portions, an outer cleat portion 21 and an inner cleat portion 22 by slot means generally designated 25 as more specifically described hereafter. Through the outer cleat portion 21 and the inner cleat portion 22 at each base portion 11 extends a longitudinal bore 23 which, as best shown in FIG. 3, is approximately at the level of the upper surface of the base portion 11.

The slot means 25 at each base portion 11 are utilized to accomodate a center link $d$ of a cross chain $c$, and hold it in position substantially perpendicular to the under surface 12 of the base portion 11. As best shown in FIG. 3, the under side portion $e$ of such center link $d$ extends entirely through the base portion 11 so as to be adjacent to the tread of the tire $a$; this makes it possible to fit the detachable device under the cross chain $c$ without any additional length of cross chain. The inner ends of two chain links $f$ adjacent to the vertically supported center link $d$ are supported in link-support recesses generally designated 30, having bottom portions 31 which in the embodiment shown are flat and substantially parallel to the under surface 12 of the base portions 11. In any event, the recess bottom portions 31 are so contoured to support the adjacent links $f$ relatively flat with reference to the tread of the tire $a$, at approximately the mid-height of the center link $d$. Each of the recesses 30 has an inner end wall 32, curved as seen in the plan view FIG. 2, which spaces the adjacent links $f$ precisely.

The slot means generally designated 25 connects the curved inner end walls 32 of the link support recesses 30, and divides the outer and inner cleat portions 21, 22 from each other; also said means 25 extends downward through the base portions 11 and through the bottom portions 31 of the link support recesses 30 to the under surface 12. In more specific detail, by such slot means 25 the outer and inner cleat portions 21, 22 are provided with parallel opposed walls 24 which extend downward beyond the longitudinal bore 23 through the base portions 11 to their under surfaces 12. The width of the slot means 25 is such as will readily accommodate the center link $d$ of the cross chain $c$. The lateral length of the slot means 25 varies; at the under surface 12 it is slightly greater than the under side portion $e$ of the link $d$; above the under surface 12 the lateral length is somewhat greater providing concave slot surface portions 26 as shown in FIGS. 2 and 3 which support the ends of the center link $d$ below the level of the recesses 30.

The height of the longitudinal cleat-like means 20, measured from the under surface 12, is at least as great as the width of the center link $d$ of the cross chain $c$ and preferably somewhat greater, as shown in FIG. 3. Hence the parallel opposed walls 24 of the outer and inner cleat portions 21, 22, on the forward and aft sides of the slot means 25 serve to support the outer sides of each center link $d$ in position substantially perpendicular to the base portions 11.

The spacing from each other of the slot means 25 in the two base portions 11 is substantially equal to the spacing of the cross chains $c$ of the skid chain $b$, as established by the arcuate side portions 13 of the device 10.

Midway between the base portions 11 along the arcuate side portions 13, and extending above the level of their arcuate upward projecting ribs 14, are lateral cleat projections 35. As shown in FIGS. 2 and 4, these may be of approximately the same size as the longitudinal cleat-like means 20. Extending laterally, they provide principally for traction for driving and breaking. The function of minimizing lateral sliding is performed principally by the longitudinal cleat-like means 20 and to some extent by the arcuate ribs 14.

Ordinary fastening means such as the bolt $g$ secured by the nut $h$ shown in phantom lines in FIG. 2, are used through the longitudinal bores 23 which extend through the aligned outer and inner cleat portions 21, 22. As best seen in FIG. 3, bolts $g$ through the two longitudinal bores 23 will penetrate the center links $d$, thus securing the entire cleat-like device in place on two adjacent cross chains $c$. Merely by loosening the side chains $b$, the cleat devices 10 may be mounted, slipping the device 10 under the cross chains $c$, lowering the center links $e$ vertically in the slot means 25, and securing by the bolt $g$ or equivalent pin-like fastener means. Removal is similarly accomplished.

When the vehicle is driven on sloping earth, the laterally extending arcuate side portions 13 bear against the tread of the tire $a$, and stabilize the cleat device 10 against pivoting on the bolts $g$ through the longitudinal bores 23. The lateral cleat projections 35 contribute to this stabilizing effect. The link-support recesses 30 effectively nest the links $f$ adjacent to the center link $d$ so as to avoid localized wear. Hence all the advantages of the present invention are achieved without causing diminution of the strength and service ability of the factory-welded cross chains $c$.

While I have illustrated and described the preferred embodiment in substantial detail, this invention is not to be construed narrowly.

I claim:

1. For use with skid chains having linking cross chains extending across the tread of a tire,
    a detachable cleat device to lessen lateral sliding, comprising
    a base portion having
    an under surface to be positioned on the tread of such tire beneath such a cross chain, and
    slot means to receive one side of a chain link of such cross chain when said link is positioned across the base portion with its plane substantially perpendicular to the under surface thereof, together with
    longitudinal cleat-like means projecting from said base portion adjacent to said slot means and having a longitudinal bore,
    whereby the device may be secured by a longitudinal extending bolt or the like penetrating through such perpendicularly positioned link and the longitudinal bore of said cleat like means.

2. A detachable cleat device as defined in claim 1, wherein:
    the slot means extends through the base portion,
    whereby the side of such a perpendicularly positioned link received therein is adjacent to the tread of such tire, thereby permitting fit of the cleat device beneath such a cross chain.

3. A detachable cleat device as defined in claim 1, wherein:
    said cleat-like means extends longitudinally and houses the longitudinal bore and is divided by the slot means.

4. A detachable cleat device as defined in claim 1, wherein:
    said cleat-like means extends longitudinally and is divided by the slot means, and the
    surfaces of the cleat means forward and aft of the slot means are substantially perpendicular to the under surface of the base portion, and
    the height of the cleat-like means measured from the under surface of the base portion is at least as great as the width of such link,
    whereby the outer side of said link is held in a position substantially perpendicular to the base portion.

5. A detachable cleat device as defined in claim 1, further having in the base portion, adjacent to both sides of the slot means,
    link support recesses having bottom portions substantially parallel to the under surface of the base portion,
    to receive and support therein the two chain links adjacent to that cross-chain link which is penetrated and secured in perpendicular position in the slot means.

6. A detachable cleat device as defined in claim 1, further having:
    a second base portion, slot means, and longitudinally bored cleat-like projecting means formed similarly to the first,
    the second slot means being at a spacing from said first slot means substantially equal to the spacing of the cross chains of such skid chain, and
    means to establish such spacing, connecting the said second base portion to the said first base portion.

7. A detachable cleat device as defined in claim 6, wherein:
    the means to connect said base portions is an open frame having side portions extending laterally outward from the said base portions,
    to bear against the tread of such tire laterally outward of said base portions and thereby to stabilize the cleat device against pivoting on bolts in said longitudinal bores.

8. A detachable cleat device as defined in claim 7, wherein:
    said laterally extending side portions have intermediate transverse cleat projections positioned and spaced between said first and second base portions.

References Cited

UNITED STATES PATENTS

| | | | |
|---|---|---|---|
| 1,091,004 | 3/1914 | Matthews | 152—228 |
| 1,567,275 | 12/1925 | Klein | 152—228 |
| 3,034,556 | 5/1962 | Boilard | 152—229 |
| 3,092,164 | 6/1963 | Le May | 152—228 X |

FOREIGN PATENTS

| | | |
|---|---|---|
| 558,528 | 3/1957 | Italy. |

JOSEPH R. LECLAIR, Primary Examiner

J. R. GARRETT, Assistant Examiner